United States Patent Office 3,196,035
Patented July 20, 1965

3,196,035
METHOD OF BONDING AN EPOXY COATING TO A POLYISOCYANATE TREATED POLYESTER FIBER BASE
Kotaro Yanagihara, Tokyo, Takenori Suzuki, Kawasaki-shi, and Akira Sakumoto, Tokyo, Japan, assignors to Fuji Tsushinki Seizo Kabushiki Kaisha, Kawasaki, Japan, a corporation of Japan
No Drawing. Filed July 11, 1961, Ser. No. 125,921
Claims priority, application Japan, July 16, 1960, 35/31,905
7 Claims. (Cl. 117—47)

Our invention relates to reinforced plastics for construction or insulation purposes and has the object to provide a material having improved chemical resistance, particularly relative to alkaline substances, conjointly with good mechanical strength.

In this respect, the reinforced plastics heretofore available, such as unsaturated polyester resin with embedded glass fibers, leave much to be desired.

For instance, if storage tanks, transportation vessels, or pipes for chemical fluids are made of such a material, the fluid, especially if alkaline, causes decomposition of the fibrous basic component and hydrolysis of the resin. This lack of chemical resistance has severely limited the applicability of such materials for chemical purposes.

A similar problem is encountered when using reinforced plastics for electric insulating purposes. For example, as a component of printed circuits, the material may have to be subjected to various chemical solvents and other substances of strong acidic or alkaline action at normal ambient temperature or at such elevated temperatures, usually above 50° C., as may occur during application of the chemicals for etching, plating or painting purposes. Chemicals are also needed for surface finishing of other industrial electronic apparatus and communication apparatus where precision and high efficiency are required. Besides, the manufacture of electrical products often requires punching, drilling, shearing or other machining of the insulating material. This tends to impair the adhesion between the fibrous constituents of the base material, or between the fibrous base material and the resin, thus severely impairing the electrical and mechanical properties.

Attempts have been made to obviate the above-mentioned deficiencies by using a fibrous base material of superior chemical resistance, low moisture absorption and high heat resistance. Such materials are available as organic synthetic fibers, especially poly(ethyleneterephthalate) fibers, under the trade names Dacron (Du Pont, U.S.A.), Tetron (Toyo Rayon, Teikoku Rayon Co., Japan), or Terylene (ICI Co., Great Britain). These and related substances are hereinafter briefly referred to as "polyester fiber." Any such substance could be used instead of glass fiber or together therewith. An improvement might also be expected from employing epoxy resin, partially or exclusively, as the impregnating resin, to take advantage of its better quality, especially as regards alkali resistance, compared with unsaturated polyester.

However, past attempts at improving reinforced plastics along the seemingly promising lines mentioned above, have failed.

In the course of comprehensive research work we have found—and this has been confirmed by findings made elsewhere—that the reason for such failure is the fact that the desired improvement in chemical resistance is incompatible, as a rule, with the likewise essential good adhesion between the heterogeneous components of the product. That is, the more the material is made resistant to chemical attack, the less perfect is the adhesion of base material to the embedding or impregnating resin.

This particularly applies to polyester fiber substance. Due to its molecular structure, its tendency to adhere to any foreign material is slight; and, even if used together with epoxy resin having generally a high adhesion, the coherence between the fibers and the resinous embedment or impregnation is insufficient to resist strong alkaline attack.

We have discovered and have established by comprehensive tests that the above-mentioned difficulties are most effectively minimized and, for many purposes, virtually eliminated by subjecting the polyester or other fibrous base material to surface treatment with a poly-isocyanate compound before combining it with impregnating or embedding resin.

According to another feature of our invention, the resin with which the isocyanate-treated fiber material is impregnated consists of thermosetting resin which comprises, or consists of, epoxy resin.

According to still another feature of the invention, the fibrous base material may comprise or consist of isocyanate-treated glass fibers.

Such reinforced plastics according to the invention exhibit exceptionally good characteristics relative to chemical, particularly alkali, resistance in conjunction with high mechanical strength and are well suitable for industrial mass production, thus obviating the deficiencies of the known reinforced plastics.

The reason why the reaction of isocyanates with polyester fiber material improves the internal cohesive properties as well as the alkali resistance of the reinforced product can be explained as follows.

As is known, a polyester fiber produced by interchange condensation reaction of ester between dimethyl terephthalate ester and ethylene glycol has the following basic molecular construction with ester linkages

on both ends of a benzene ring

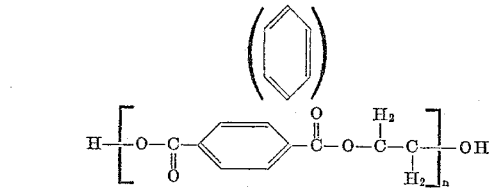

wherein $n$ denotes the degree of condensation (above 40).

It appears that any linkage with another material will be attached mainly to a dipole linkage on an ester group. For that reason, and because of the extremely prominent crystallization and orientation between polyester molecules, the adhesion to other materials is weak and the polar group density is high. Hence, a low-molecular compound of this type is not really adhesive unless it has an exceptionally high degree of freedom of molecular motion. Thus it can be understood that an adhesiveness of sufficient resistance to strong chemicals such as alkalis is not achieved if the polyester fiber is directly impregnated with a common thermosetting resin.

By comparison, if the fibrous base material is previously treated with an isocyanate compound of comparable low molecular weight and low viscosity, the isocyanate group (—N=C=O) and urethane group

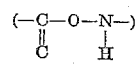

included in that molecule react with water and with the resulting amino group (—NH$_2$) or urea group

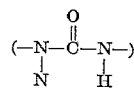

according to the formulas:

$$R-NCO + H_2O \rightarrow R-NHCOOH$$
$$R-NHCOOH \rightarrow R-NH_2 + CO_2$$
$$R-NH_2 + R-NCO \rightarrow R-NHCONH-R$$

Besides, the amido group

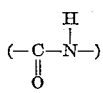

is produced by reaction of the isocyanate group with the urethane group or urea group, the reaction being as follows:

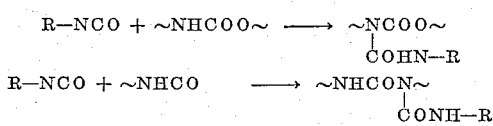

These complex groups have a relatively free orientation. Furthermore, the surface of the base material is surrounded by the same polar groups while being changed into a resin when reacting mutually under a suitable heat treatment, and also when the base material is being impregnated with a thermosetting resin having a hydroxyl group (—OH), carboxy group (—COOH), methylol group (—CH$_2$OH), epoxy group

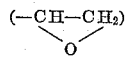

and other polar group capable of forming a primary or secondary chemical bond with the said polar groups. For these reasons, a higher degree of adhesiveness is obtained.

Accordingly, the method of our invention is performed as follows. We use an aromatic or aliphatic diisocyanate, triisocyanate, or their initial polymerizaton products comprising more than two isocyanate groups or urethane groups within a molecule. We dissolve the poly-isocyanate substance in an organic solvent such as an aromatic hydrocarbon, chlorinated hydrocarbon, ester, ketone or a mixture of such solvents. The resulting homogeneous solution is applied to the surface of the fibrous polyester substance that is to serve as the base for the reinforced plastic to be produced. This is done by dipping the fibrous substance into the solution or spraying the solution onto the base substance, and then drying the coated substance by heating it at 80 to 180° C. for a period of 10 to 120 minutes. The non-volatile final amount of isocyanate coating may be 1 to 30% by weight of the base material. The prepared polyester fibrous base material is then impregnated with an epoxy resin or thermosetting resin including epoxy resin.

In each case the most suitable amount of poly-isocyanate compound should be chosen in accordance with the particular purpose and the particular polyester fibrous substance and its constitution in order to obtain an even coating on the entire surface of the polyester fiber. Since this preferred amount varies in dependence upon the thickness of the polyester fiber and the shape of the material, a universally best quantity cannot be stated. As a rule, however, the preferred amount (by weight of the fiber) does not exceed 20%, because greater amounts no longer improve adhesion to an appreciable extent and hence become uneconomical. In most cases, an amount of 4 to 6% poly-isocyanate compound is sufficient and satisfactory.

It is also impossible to specify a generally best suitable heating temperature and drying time for treating the poly-isocyanate solution coated upon the polyester fibrous base material, because the preferred drying conditions vary in dependence upon the particular poly-isocyanate compound being used, the kind and concentration of the solution, the amount coated upon the polyester fibrous material, and to some extent upon the available facilities.

However, one skilled in the art can readily determine the drying conditions, suitable for the particular materials being used by keeping in mind the function of the heating and drying operation. It is of importance that the heating and drying treatment not only serves for eliminating the solvent but also for promoting the primary or secondary reaction of the poly-isocyanate compound itself and of the base material with the poly-isocyanate, to thereby increase the degree of adhesion and accelerate its stabilization. If the temperature is too low and the drying time too short, the subsequently applied impregnating resin may react with residual isocyanate, with the result of reducing the shelf life and stability of the ultimate product. Conversely, if the drying temperature is too high and the drying time too long, the process is not only inefficient economically but also tends to result in thermal decomposition of the isocyanate compound and the polyester molecule. The most suitable drying conditions, therefore, are best determined for each particular case.

Following are examples of poly-isocyanate compounds suitable for the purpose of the invention.

No. 1: Metaphenylene diisocyanate

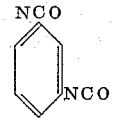

No. 2a: 2,4 toluene diisocyanate

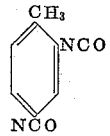

No. 2b: 2,6 toluene diisocyanate

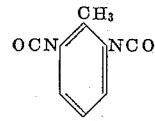

No. 3: Diphenylmethane 4,4' diisocyanate

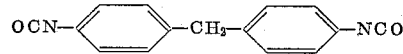

No. 4: Diphenyl 4,4' diisocyanate

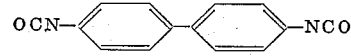

No. 5: 1,5 diisocyanate naphthalene

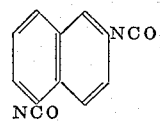

No. 6: 2,4 diisocyanate chlorbenzene

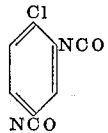

No. 7: 4,4'4'' triisocyanate triphenyl methane

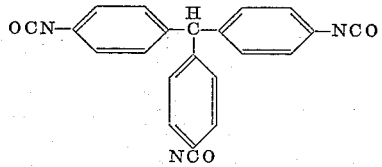

No. 8: Polymethylene diisocyanate $$OCN-(CH_2)n-NCO$$

($n = 2$ to 10)

Compounds Nos. 1 to 7 are aromatic, and compound No. 8 is an aliphatic poly-isocyanate compound. Further used were initially low polymerization products having at least two or more isocyanate or urethane groups within a molecule obtained by reacting the above-identified poly-isocyanate compounds with such polyhydric alcohols as glycol or a triol. For instance, used was a polymerization product of 3 moles 2,4 toluene diisocyanate, as shown above in compound No. 2a, and 1 mole of 2,3,5 hexane triol, and having the following formula:

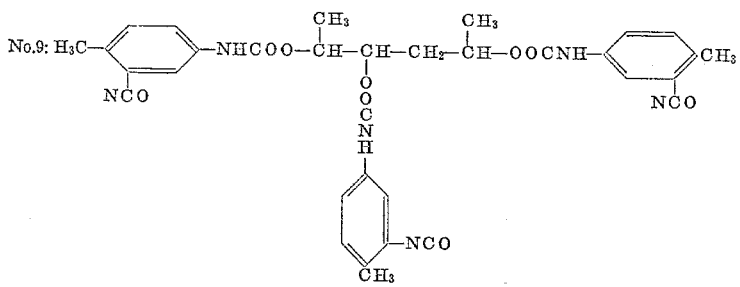

The above-described compounds are favorable because of their chain flexibility and low vapor pressure. Compound No. 9 is particularly easy to handle. It is colorless and non-toxic.

The following organic solvents can be used for the various kinds of poly-isocyanate compound described above:

(1) Chlorinated hydrocarbons:
   (a) Methylene chloride $CH_3Cl$
   (b) Dichlorethane $ClCH_2 \cdot CH_2Cl$
   (c) Trichlorethylene $ClCH=Cl_2$
(2) Esters:
   (a) Methyl acetate $CH_3COOCH_3$
   (b) Ethyl acetate $CH_3COOCH_2H_5$
(3) Ketones:
   (a) Acetone $CH_3COCH_3$
   (b) Methyl ethyl ketone $CH_3COC_2H_5$
(4) Aromatic compounds:

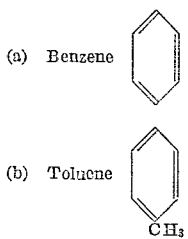

(a) Benzene (b) Toluene

These solvents can be used independently or in mixture according to the purpose. They must be free of moisture and other impurities.

In the examples specifically described below, the fibrous base material in all cases consisted of the same polyester-fiber cloth in order to permit a study and comparison of properties. It will be understood that analogous comparative results are also obtained with other flat surfaced base material of constant width and constant thickness, such as fiber mats or the like non-woven webs, and also with base material of other constitutions and shape used for reinforced plastic materials, such as chopped fiber strands, slivers or rovings.

(1) ISOCYANATE TREATMENT OF POLYESTER FIBER BASE MATERIAL

Used was a polyester fiber cloth, about 0.6 mm. thick, with 27 threads per inch longitudinally as well as transversely, woven from two ply thread of 664 denyl (denier) thickness. This web material, finished only by scouring and heating, is hereinafter called "untreated base." The same material additionally treated with poly-isocyanate compound according to the invention is hereinafter referred to as "treated base."

*Sample A.*—An amount of 75 g. poly-isocyanate compound No. 9 was dissolved in a solvent mixture of 25 g. ethyl acetate and 670 g. trichlorethylene. The untreated base was dipped into the solution for a few minutes at normal room temperature (20° C.), then removed, slightly pressed between rollers and then dried for 15 minutes at 135° C. The amount of isocyanate adhering to the base was 6% (all percentages by weight). This intermediate product is hereinafter referred to as "treated base A."

*Sample B.*—An amount of 60 g. poly-isocyanate compound No. 7 was dissolved in a solvent compound in the proportion of 40 g. methylene chloride and 800 g. ethyl acetate. The untreated base was dipped into the solution for a few minutes at normal room temperature (20° C), then removed, slightly pressed between rollers and then dried by heating for 40 minutes at 100° C. The adhering amount of isocyanate was 4%. This intermediate material is hereinafter called "treated base B."

(2) PRODUCTION OF LAMINATES FROM UNTREATED AND TREATED BASES

Three kinds of thermosetting resins were used for producing laminates from the above-described base materials, namely, unsaturated polyester, phenol resin, and epoxy resin. The resins used are identified below in Table 1. The impregnation, heating and drying were in each case effected in accordance with the specifications of the respective resin manufacturers.

*Table 1.—Thermosetting resins used for impregnation*

| Designation | Trade name | Manufacturer | Remarks |
| --- | --- | --- | --- |
| Unsaturated Polyester | Polyliten [1] ODR-105 | Japan Reichhold Chemicals Inc. | For dry type Allyl type B.P.O. catalyst. |
| Phenol Resin | Plyophene [2] 5030 | ____do____ | Alcohol soluble for general type laminate. |
| Epoxy Resin | Epikote [3] 828 | Shell Chemical Co. | Hardener, diaminodiphenyl-sulfone. |

[1] Unsaturated polyester resin, cf. Modern Plastics Encylcopedia (1960), page 543.
[2] Phenol formaldehyde resin, cf. Modern Plastics Encyclopedia (1960), page 543.
[3] Phenol-type epoxy resin (U.S. Trademark EPON 828), cf. Modern Plastics Encyclopedia, page 544.

The laminate specimens manufactured from the above-mentioned bases and the listed resins are identified in Table 2.

*Table 2.—Laminate sample numbers and contents*

| Bases | 3 sheets of polyester fiber untreated base | 3 sheets of treated base A | 3 sheets of treated base B | 2 sheets of polyester treated base A +4 sheets of glass cloth |
|---|---|---|---|---|
| Unsaturated polyester | No. 1 | No. 2 | | |
| Phenol Resin | No. 3 | No. 4 | No. 5 | |
| Epoxy Resin | No. 6 | No. 7 | No. 8 | No. 9 |

The glass cloth is Volan finished (the glass fiber surface is finished by Volan agent consisting of methacrylate chromic chloride) and has a thickness of 0.1 mm. The polyester fiber is placed on top and bottom of the glass cloth base.

The laminates were formed by means of an automatic oil hydraulic press in accordance with the data presented in Table 3.

*Table 3.—Forming condition of laminates*

| | Heat plate temperature, °C. | Surface pressure, kg./cm.$^2$ | Press time, min. | After curing time, 140° C., minutes |
|---|---|---|---|---|
| Unsaturated polyester | 120 | 10 | 60 | 120 |
| Phenol Resin | 145 | 85 | 80 | 120 |
| Epoxy Resin | 150 | 25 | 80 | 120 |

The thickness of each laminate was 1.4 to 1.5 mm. The resin content was 40 to 45%.

(3) COMPARISON OF LAMINATES (3–1) COMPARISON OF PEEL STRENGTH BETWEEN BASE CLOTH

From each of sample Nos. 1, 2, 3, 4, 6, 7 as shown in Table 2, a plate of 10 x 100 mm. size was cut. Its most outward base was stripped in the longitudinal direction for a distance of about 20 mm. from one narrow end of each plate. The other end was clamped in a chuck. The force required to strip the base in a direction perpendicular to the plate was measured by a spring balance. The results are shown in Table 4.

It is apparent from Table 4, that, while there are differences between absolute values of strength for respectively different resins, each isocyanate finished base has a greatly improved adhesiveness over the corresponding untreated base.

(3–2) ELECTRICAL INSULATION AFTER BOILING 2 HOURS IN DISTILLED WATER

From each sample No. 1 to No. 9 listed in Table 2, a plate of 20 x 40 mm. size was cut. Two holes of 5 mm. diameter were drilled through each plate with a mutual center spacing of 15 mm. The plates were boiled for 2 hours in distilled water, then washed for 30 minutes in flowing water, and then dried. A direct voltage of 500 v. was applied across two taper pins inserted into the respective holes, and insulation resistance was measured (in the manner described in standards JIS K 6707; JIS K means Chemical Industry Section of Japanese Industrial Standard, and 6707 identifies the testing method of a phenol resin laminated plate). The results are shown in Table 5.

*Table 5.—Electrical insulation resistance after boiling*

| Resin | Unsaturated Polyester | Phenol Resin | | | Epoxy Resin | | | |
|---|---|---|---|---|---|---|---|---|
| Sample No | 1 | 2 | 3 | 4 | 5 | 6 | 7 | 8 | 9 |
| Resistance in megohms | 10 | >10$^0$ | 8 | >10$^0$ | >10$^0$ | >10$^6$ | >10$^6$ | >10$^6$ | >10$^6$ |

The tabulated data exhibit a notable improvement for the unsaturated-polyester and phenol-resin products due to the isocyanate treatment, aside from the fact that the products with the untreated bases (samples Nos. 1 and 3) are useless in practice because of impaired adhesion between base and resin.

On the other hand, in the case of epoxy resin, a boiling test of about this extent was insufficient, at the sensitivity ($10^{-10}$ A) of the test equipment, to reveal any difference between the treated and untreated epoxy-impregnated products. This is in accordance with the naturally much greater adhesiveness of epoxy resin.

(3–3) QUALITY COMPARISON AFTER BOILING FOR 2 HOURS IN A SOLUTION OF 1% NaOH

From samples No. 1 to No. 9 listed in Table 2, plates prepared in the same manner as described above under title (3–2) were boiled for 2 hours in an aqueous solution of 1% NaOH, and rinsed for 30 minutes in water.

Then the direct-current insulation resistance was measured in the same way as described above. The results are shown in Table 6.

*Table 6.—Insulation resistance after boiling for 2 hours in 1% NaOH*

| Resin | Unsaturated Polyester | | Phenol Resin | | | Epoxy Resin | | | |
|---|---|---|---|---|---|---|---|---|---|
| Sample No | 1 | 2 | 3 | 4 | 5 | 6 | 7 | 8 | 9 |
| Insulation resistance in megohms | Short | 10 | Short | 10$^5$ | 10$^5$ | 3×10$^2$ | >10$^6$ | >10$^6$ | >10$^6$ |

*Table 4.—Comparison of peel strength between base cloth*

| Resin | Unsaturated Polyester | | Phenol Resin | | Epoxy Resin | |
|---|---|---|---|---|---|---|
| Sample No | 1 [a] | 2 [b] | 3 [a] | 4 [b] | 6 [a] | 7 [b] |
| Peel strength | 2.3 | 4.1 | 3.2 | 4.7 | 4.4 | 6.2 |

[a] Untreated.  [b] Treated A.

A comparison with Table 6 shows that the unsaturated polyester product was deteriorated both when treated and untreated. This was due to excessive hydrolysis of the resin itself. However, Table 6 also shows that the phenol-resin product was changed only slightly when used with treated base and remained satisfactorily resistant to the alkaline fluid. It will also be recognized that the epoxy-resin product deteriorates greatly when untreated (sample No. 6), but suffered no change in quality with a treated base.

(3-4) QUALITY COMPARISON AFTER BOILING FOR 2 HOURS IN A 5% NaOH SOLUTION

Samples Nos. 1, 2, 3, 4, 6, 7 from Table 2 were boiled for 2 hours in a 5% NaOH solution, then rinsed for 30 minutes in flowing water. Thereafter, the samples were measured as to their retention of peel strength in percent (by the same method as described under (3-1)), tensile strength in percent (by the method according to standards JIS K 6707), direct-current insulation resistance in megohms (by the same method as described under (3-3)), and alternating-current dielectric strength in kv./mm. (specimens and method according to standard JIS K 6707, the test of dielectric strength is as follows. A test piece of reinforced plastics with smooth surface is inserted between the electrode, and then commercial frequency voltage of 1.34–1.48 crest factor or peak factor is impressed. Voltage is rapidly risen from 6 kv./mm. (min.) to 16 kv./mm. (max.), when this test piece must not be decomposed for a minute). The results are shown in Table 7.

*Table 7.—Qualities after boiling for 2 hours in a 5% NaOH solution*

| Resin | Unsaturated Polyester | | Phenol Resin | | Epoxy Resin | |
|---|---|---|---|---|---|---|
| Sample No | 1 | 2 | 3 | 4 | 6 | 7 |
| Retention of peel strength (percent). | Decompose | Decompose | 50 | 78 | 82 | 95 |
| Retention of tensile strength (percent). | do | do | 40 | 83 | 81 | 98 |
| Insulation resistance in megohms. | do | do | Short | Short | 12 | >10⁶ |
| Dielectric strength | do | do | do | do | 10 | 33 |

The tabulated data illustrate the following facts.

Unsaturated polyester decomposes completely, whether treated or untreated, due to hydrolysis of the resin itself, and no useful laminate is formed. Phenol resin fails to pass an electrical test and decomposes by short-circuiting, but mechanical strength and adhesiveness can be greatly improved by isocyanate treatment, so that this product is practically applicable where the main purpose is mechanical strength. In contrast, for epoxy-resin products, the treatment according to the invention results in excluding any decomposition, both electrically and mechanically, and produces an alkali resistance far superior to that of all known products of this type.

Aside from the improved qualities of the finished product, the permanence and shelf life of the isocyanate-treated polyester-fiber base materials have been found greatly improved so as to permit storing the intermediate products for a considerable length of time and subsequently impregnating them to obtain the laminate. This has been ascertained by storing the above-mentioned specimens of isocyanate-treated bases in a room where they remained freely exposed to ordinary atmospheric conditions for more than 6 months after the isocyanate treatment. Even though residual isocyanate on the base materials reacts with atmospheric moisture and other substances during storage, the compounds resulting from such reaction are of the desirable type having amino or urea groups which are not detrimental but tend to increase the adhesiveness of the material relative to the impregnating resin subsequently applied. Therefore, the treated base materials do not require any special preparation or expedients for proper handling and preservation. This is one of the outstanding desiderata for industrial mass production of such reinforced plastics.

As is shown by the above-presented test results, the invention is particularly effective for polyester and similar organic fiber substances impregnated with, or embedded in, thermosetting resin including epoxy resin. The degree of cohesion within the base material and adhesion between base and impregnation, as well as the alkali resistance of such products excel the properties of all reinforced plates of the general kind heretofore available for industrial production.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:

1. The method of preparing an alkali-resistant reinforced plastic construction material, which comprises the steps of coating the exposed surfaces of a polyethyleneterephthalate polyester fiber base with a polyisocyanate compound having at least two isocyanate groups in its molecule and then impregnating the so-coated base with an epoxy resin.

2. The method according to claim 1, wherein the polyisocyanate compound is an aromatic diisocyanate.

3. The method according to claim 1, wherein the polyisocyanate is an aromatic triisocyanate.

4. The method according to claim 1, wherein the polyisocyanate is an aliphatic diisocyanate.

5. The method according to claim 1, wherein the polyisocyanate is an aliphatic triisocyanate.

6. The method according to claim 1, wherein the polyisocyanate compound is an esterified polymerization product of a polyisocyanate and has more than 2 urethane groups within its molecule.

7. The method of preparing alkali resistant reinforced plastic bodies, which comprises impregnating a polyethyleneterephthalate polyester fiber base with a solution of a polyisocyanate compound having more than two isocyanate groups in its molecule, in a volatile solvent, evaporating said solvent and leaving a coat of said polyisocyanate on the fibers of said base, impregnating the coated fibers with an epoxy resin material and setting said resin.

References Cited by the Examiner

UNITED STATES PATENTS

| | | | |
|---|---|---|---|
| 2,333,917 | 11/43 | Christ et al. | 117—76 |
| 2,415,839 | 2/47 | Neal et al. | 117—150 |
| 2,430,479 | 11/47 | Pratt et al. | 117—130 |
| 2,439,514 | 4/48 | Herndon | 117—150 |
| 2,503,209 | 4/50 | Nyquist et al. | 117—150 |
| 2,594,979 | 4/52 | Nelson | 117—150 |
| 2,606,892 | 8/52 | Kropa et al. | 117—150 |
| 2,647,884 | 8/53 | Wystrach | 117—150 |
| 2,657,151 | 10/53 | Gensel et al. | 117—150 |
| 2,676,164 | 4/54 | Charlton et al. | 117—150 |
| 2,698,241 | 12/54 | Saner | 117—150 |
| 2,698,242 | 12/54 | Saner | 117—150 |
| 2,721,811 | 10/55 | Dacey et al. | 117—150 |
| 2,723,935 | 11/55 | Rodman | 117—150 |
| 2,766,164 | 10/56 | Salem | 117—150 |
| 2,780,612 | 2/57 | Grotenhuis | 117—126 |

(Other references on following page)

UNITED STATES PATENTS

| | | | |
|---|---|---|---|
| 2,826,526 | 3/58 | Meyrick | 117—150 |
| 2,841,205 | 7/58 | Bird | 117—150 |
| 2,862,281 | 12/58 | Klausner | 117—54 X |
| 2,893,892 | 7/59 | Pinte et al. | 117—126 |
| 2,938,823 | 5/60 | Salem et al. | 117—150 |
| 2,967,117 | 1/61 | Arledter et al. | 117—126 |
| 2,988,457 | 6/61 | Gatcomb | 117—76 |
| 2,993,825 | 7/61 | Gage | 117—76 |
| 3,035,475 | 5/62 | Rinke et al. | 118—138.8 |

FOREIGN PATENTS

| | | |
|---|---|---|
| 118,839 | 8/44 | Australia. |
| 149,423 | 12/52 | Australia. |
| 644,829 | 10/50 | Great Britain. |
| 745,960 | 3/56 | Great Britain. |
| 758,433 | 10/56 | Great Britain. |
| 564,777 | 10/58 | Canada. |
| 585,378 | 10/59 | Canada. |

OTHER REFERENCES

Dombrow: Polyurethanes, Reinhold Pub. Corp., New York (pp. 4, 136 and 144–146 relied on).

Skiest: Epoxy Resins, Reinhold Pub. Corp., New York (pp. 259 and 260 relied on).

Landells: "Modern Resin Finishing of Textiles," Journal of the Society of Dyers and Colorists, vol. 72, No. 4, April 1956, p. 145 relied on.

WILLIAM D. MARTIN, *Primary Examiner.*

RICHARD D. NEVIUS, *Examiner.*